United States Patent
von Tobel

[15] 3,679,675
[45] July 25, 1972

[54] PHTHALOCYANINES

[72] Inventor: Hans von Tobel, Riehen Basel-Land, Switzerland

[73] Assignee: Sandoz Ltd., Basel-Land, Switzerland

[22] Filed: March 30, 1970

[21] Appl. No.: 23,997

[30] Foreign Application Priority Data

April 3, 1969 Switzerland ............................5157/69
April 25, 1969 Switzerland ............................6314/69

[52] U.S. Cl. .........................................260/242, 8/10, 8/54, 8/54.2, 8/55, 250/37 P, 250/240 CA, 260/248 CS, 260/249.8, 260/256.5 R, 260/306.8 D, 260/314.5
[51] Int. Cl. .......................................................C07d 27/74
[58] Field of Search..........................260/242, 314.5, 256.5 R

[56] References Cited

UNITED STATES PATENTS 3,232,931 2/1966 Rothman ..............................260/242
3,351,594 11/1967 Clark et al. ............................260/242

FOREIGN PATENTS OR APPLICATIONS 1,391,643 1/1965 France....................................260/242

*Primary Examiner*—Henry R. Jiles
*Assistant Examiner*—G. Thomas Todd
*Attorney*—Littlepage, Quaintance, Wray & Aisenberg

[57] ABSTRACT

Dyes of the formula $$PC \underset{(SO_2-N-A-N-C-C_rH_{2r}-N-X)_p}{\overset{(SO_3H)_m}{\left(SO_2-N\underset{R_2}{\overset{R_1}{\diagdown}}\right)_{n-1}}}$$

$$\underset{R_3 \quad R_4 \quad O \quad \quad R_5}{}$$

wherein
PC is the radical of a phthalocyanine,
$R_1$ and $R_2$ are each H or a hydrocarbon radical or, together with N, a hetero ring,
$R_3$ and $R_4$ are each H or (substituted) alkyl or, together with A and both N atoms, a hetero ring,
$R_5$ is H or (substituted) alkyl,
X is a fiber-reactive radical
$m$ is 1 to 3,
$n$ is 1 to 3,
$p$ is 1 or 2,
$r$ is 1 to 5,
the sum $m+n+p$ is 4 or 5,
are especially good for printing cellulosic and polyamide fibers.

11 Claims, No Drawings

PHTHALOCYANINES

This invention relates to reactive phthalocyanine compounds of the formula

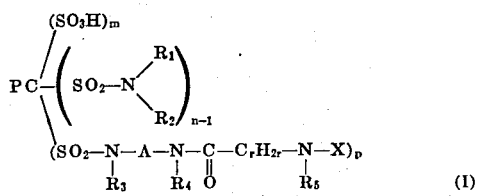

In this and the following formulas

PC stands for the radical of a phthalocyanine,

A for a divalent bridge member containing at least two carbon atoms, $R_1$ and $R_2$ each for a hydrogen atom or a hydrocarbon radical, or $R_1$ and $R_2$ together with the adjacent nitrogen atom for a heterocycle, $R_3$ and $R_4$ each for a hydrogen atom or a lower alkyl radical which may be substituted, or $R_3$ and $R_4$ together with the adjacent nitrogen atoms and the bridge member A for a heterocycle, $R_5$ for a hydrogen atom or a lower unsubstituted or substituted alkyl radical, X for an acyl radical which contains at least one substituent cleavable as an anion and/or A C—C multiple linkage capable of addition, or for a halogenopyrimidyl, halogenotriazinyl or halogenopyrimidylalkylene radical, $m$ for 1 to 3, $n$ for 1 to 3, $p$ for 1 or 2, preferably 1, and $r$ for 1 to 5, preferably 1, the sum of $m$, $n$ and $p$ being 4 or 5.

The compounds of formula (I) can be produced by reaction of 1 mole of a compound of the formula

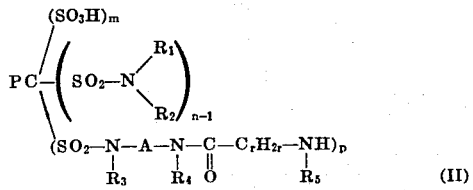

with $p$ moles of an acylating agent, which further contain a substituent cleavable as an anion and/or a C—C multiple linkage capable of addition, or of a polyhalogenopyrimidine, polyhalogenotriazine or halogenalkyl-mono- or -polyhalogenopyrimidine.

In relation to the nearest comparable phthalocyanine compounds, which do not bear the bridge member $—CO—C_rH_{2r}—NR_5—$, the compounds of the present invention exhibit major advantages. For example, many compounds in which the bridge member $—CO—C_rH_{2r}—NR_5—$ does not occur cannot be produced, or only with great difficulty, if the radical A bears a substituent in ortho position to the $—NR_4—$ group which sets up steric hindrance. Thus compounds which contain the grouping

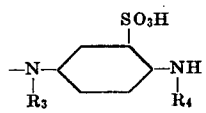

are virtually non-condensible with halogenopyrimidines.

A further advantage of the compounds disclosed herein is that a lower, if desired substituted, alkyl radical, e.g. an alkyl, hydroxyalkyl or phenylalkyl radical, can be introduced as the $R_5$ radical with the utmost ease. This advantage resides in the fact that dyes in which the reactive radical is bound to the dye molecule through

where R represents a lower, optionally substituted alkyl radical, possess higher reactivity than those in which R represents hydrogen (cf. H. Ackermann and P. Dussy, Helv, Chim. Acta (1962) p. 1,683), and that the unfixed proportion of the applied dye can be more readily washed off the dyed or printed substrate (cf. French patent 1 360 036). With dyes from which the bridge member $—CO—C_rH_{2r}—NR_5—$ of this invention is absent, it is often impossible to give $R_4$ the significance of a lower alkyl or hydroxyalkyl radical, or if possible only by using laborious methods.

The substituent X is any desired fiber-reactive radical, e.g. a reactive acyl group or a reactive heterocycle. If the substituent X stands for a reactive acyl group, it may be the radical of an aliphatic acid which bears at least one halogen atom which splits off as an anion or a group which splits off as an anion, e.g. $—O—SO_3H$, and/or a C—C double bond capable of addition. Examples include the radicals of chloroacetic, bromoacetic, β-chloropropionic, β-bromopropionic, α,β-dichloropropionic, α,β-dibromopropionic, acrylic, methacrylic, α-chloro-acrylic, α-bromacrylic, γ-chlorocrotonic, γ-bromocrontonic, α,β- and β,β-dichloroacrylic, α,β- and β,β-dibromoacrylic, trichloracrylic, tribromacrylic, β-sulphatoethylsulphonic, vinylsulphonic, β-methylsulphonyloxypropionic, β-phenylsulphonyloxypropionic and β-(4'-methylphenylsulphonyloxy)-propionic acid, and the radicals of heterocyclic or heterocyclic-aliphatic acids containing halogen, such as 2,4-dichloropyrimidine- and 2,4-dibromopyrimidine-5-carboxylic, 2,4-dichloro- and 2,4-dibromo-6-methyl- or -6-chloromethylpyrimidine-5-carboxylic, 2,3-dichloro- and 2,3-dibromoquinoxaline-5- or -6-carboxylic acid, -sulphonic acid or -iso-cyanate, 2-(3)-monochloroquinoxaline-6-carboxylic, 1,4-dichlorophthalazine-6-carboxylic, 2-chlorobenzoxazole-5, -6- or 7-carboxylic, 2-chlorobenzothiazole-5-carboxylic or -5-sulphonic, 3- or 4-(4',5'-dichloro-6'-pyridazonyl-1')-benzene-1-carboxylic or β-(4',5'-dichloro-6'-pyridazonyl -1')-propionic acid. If the substituent X stands for a radical of a pyrimidine derivative, it may be selected from the radicals of pyrimidines containing at least two mobile halogen atoms, e.g. the radicals of 2,4,6-trichloro-, 2,4,6-trifluoro- or 2,4,6-tribromo-pyrimidine or their derivatives which may bear substituents in the 5-position, for example methyl, ethyl, cyano, carboxy, carboxylic acid methyl ester or ethyl ester, chlorovinyl, substituted alkyl, e.g. carboxylmethyl, chloromethyl, bromomethyl; further the radical of 2,4,5,6-tetrachloro-, -tetrafluoro- or -tetrabromo-pyrimidine, 5-bromo-2,4,6-trichloropyrimidine, 5-chloro- or 5-bromo-2,4,6-trifluoropyrimidine, 2,4-dichloro-5-chloromethylpyrimidine, 2,4-dibromo-5-bromoethylpyrimidine, 2,4-dichloro-5-chlormethyl6-methylpyrimidine and 2,4-dibromo-5-bromomethyl-6-methylpyrimidine. If the substituent X stands for a radical of a triazine derivative, the radicals of polyhalogenotriazines are suitable, e.g. those of cyanuric chloride, cyanuric bromide or of a cyanuric halide derivative of formula

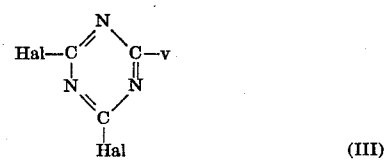

Where Hal represents chlorine or bromine and $v$ the radical, which may be further substituted, of a primary or secondary aliphatic, alicyclic, aromatic or heterocyclic amine, of an aliphatic, alicyclic, aromatic or heterocyclic hydroxyl or thiole compound in particular the radical of aniline, its alkyl, sulphonic acid or carboxylic acid derivatives, or the radical of lower mono- and di-alkylamines or of ammonia.

Each of the radicals $R_3$, $R_4$ and $R_5$ represents hydrogen or a substituted or unsubstituted alkyl radical, preferably a lower hydroxyalkyl or arylalkyl radical or an unsubstituted lower alkyl radical, e.g. methyl, ethyl, propyl, isopropyl, butyl, isobutyl, ndamyl, hydroxymethyl, 2-hydroxyethyl, 2- or 3-hydroxypropyl, 2-, 3- or 4-hydroxyl-n-butyl, benzyl, phenylethyl or p-methylbenzyl.

The bridge member A is any desired divalent radical of the aliphatic (preferably with two to six carbon atoms), cycloaliphatic, aromatic (preferably mono- or dinuclear) or heterocyclic series, e.g. one of the radicals of the following formulas:

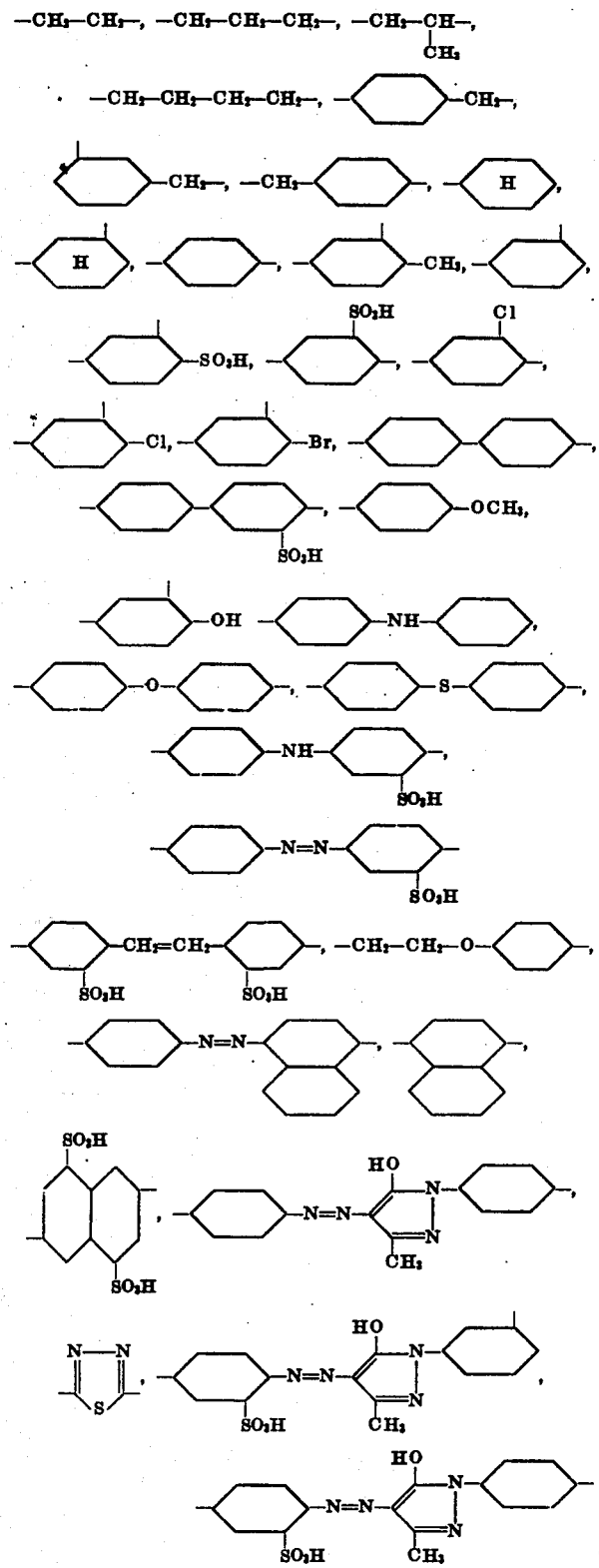

If $R_3$ and $R_4$ are conjoined to form a bridge member, A is preferably aliphatic and the radical

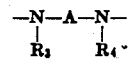

represents the radical of a heterocycle containing two nitrogen atoms, e.g.

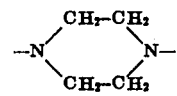

It is of advantage for A to be a divalent aromatic radical, preferably a benzene radical which bears a substituent, in particular a sulphonic acid group, in ortho-position to the

group.

The selection of suitable radicals $R_1$ and $R_2$ comprises, besides hydrogen atoms, hydrocarbon radicals, those of lower molecular weight being preferred, e.g. alkyl radicals, substituted if desired, such as methyl, ethyl, propyl, iso-propyl, hydroxyethyl, $\beta$- or $\gamma$-hydroxypropyl and $\beta$-hydroxybutyl radicals.

The phthalocyanine radicals PC may contain or may be free from metal, though they are preferably metal-containing, cobalt-, copper- and nickel-containing phthalocyanine radicals being of special interest.

Compounds of formula (I) of notably high quality are those of formula

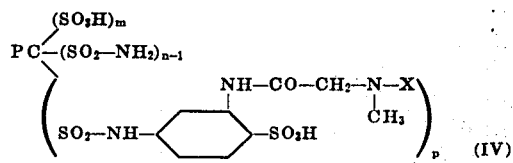

where PC represents the radical of a nickel or preferably copper phthalocyanine and X the radical of a polyhalogenopyrimidine, where halogen may have the significances of fluorine, chlorine or bromine, but is preferably fluorine or chlorine.

The reaction of the compound of formula (II) with the reactive component can be conveniently effected in aqueous medium. To introduce the aliphatic acyl radicals containing a substituent which splits off as an anion and/or a C—C multiple linkage capable of addition, it is best to employ the halide or anhydride of the acid and to work with a well cooled medium set with an agent which binds acid, such as sodium carbonate, sodium hydroxide, barium hydroxide, calcium hydroxide or sodium acetate.

For the purpose of acylation the halide of the carboxylic acid can be used as it is, or it can be dissolved in two to five times the amount of benzene, chlorobenzene, methylbenzene, dimethylbenzene or acetone and the solution dropped into the aqueous solution of the compound bearing the amino group at a temperature in the range of 0° to 30° C, preferably at 2°–5° C, in the presence of an acid-binding agent, e.g. at a pH value of 7 to 3. With carboxylic or sulphonic acid halides of the halogen-containing heterocyclic compounds, the temperature may range from 0° to 100° C, e.g. from 0° to 50° C or preferably 0°–25° for the 2,4-dihalogenopyrimidine-5-carboxylic acid halides, from about 10° to 50° C or preferably 20°–30° C for the 3- or 4-(4',5'-dichloro-6'-pyridazonyl- 1')-benzenecarboxylic acid chlorides and $\beta$-(4',5'-dichloro-6'-pyridazonyl-1')-propionic acid chlorides, and from about 20° to 90° C for the halogenoquinoxaline-, -phthalazine-, -benzoxazole- or -benzothiazole-carboxylic acid chlorides or -sulphonic acid chlorides, preferably from about 30° to 70° C for the 2,3-dichloroquinoxaline-6-carboxylic acid chloride or -6-sulphonic acid chloride. The reaction is allowed to proceed at a weakly alkaline, neutral to weakly acid reaction, preferably in the pH region of 7 to 3, e.g. at pH 6 to 4.

The reaction with the polyhalogenopyrimidines or polyhalogenotriazines is likewise effected in aqueous medium, the halide being employed either as it occurs in concentrated form or in solution in an organic solvent. Acetone, chloroform, benzene, chlorobenzene and toluene are highly suitable solvents for this purpose.

The reaction temperature is adjusted to the reactivity of the starting products and may vary from 0° to 100° C. It lies in the region of 0° to 20° C for cyanuric chloride and cyanuric bromide, 0° to 30° C for tri- and tetra-fluoropyrimidines, 30° to 50° C for the monocondensation products of cyanuric chloride or bromide and ammonia which contain two mobile halogen atoms, for a primary or secondary amine, an alcohol, thioalcohol, phenol or thiophenol, and 20° to 100° C for polyhalogenopyrimidines bearing 2, 3 or 4 chlorine and/or bromine atoms. If temperatures higher than about 40° C are necessary, it is advisable to react in a vessel fitted with a reflux condenser in view of the volatility in water vapor of the halogenopyrimidines. The reaction can be conducted in a weakly alkaline, neutral to weakly acid medium at a pH from 9 to 4, a value in the region of pH 8 to 5 being preferable.

In order to maintain the pH constant in the course of the reaction of the amino compound of formula (II) with the reactive component, an agent which binds acid, for example sodium acetate, can be added to the solution at the commencement of the reaction, or alternatively small amounts of sodium or potassium carbonate or bicarbonate in solid, pulverized form or in concentrated aqueous solution can be added during the reaction. Other suitable neutralizing agents are aqueous solutions of sodium or potassium hydroxide. The rate of reaction can be accelerated by adding small amounts of a wetting or emulsifying agent.

The phthalocyanine dyes thus formed can be precipitated from their aqueous solutions by the addition of salt, after which they are filtered off, washed if necessary and dried.

The compounds of formula (II) can be produced by reaction of 1 mole of a compound of the formula

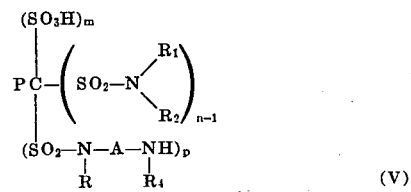

(V)

with $p$ moles of a functional derivative of a halogenated carboxylic acid or of a functional derivative of a carboxylic acid which has a double bond capable of addition, followed by reaction of the resulting compound of the formula

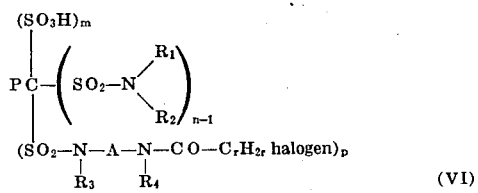

(VI)

or

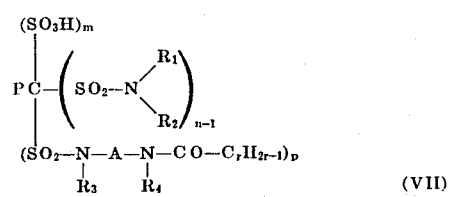

(VII)

with $p$ moles of an amine of formula $R_5NH_2$ (VIII).

Examples of carboxylic acid derivatives which are suitable for reaction with compounds of formula (V) are the anhydrides and halides of $\alpha$-, $\beta$- or $\gamma$-halogenated aliphatic acids and or $\alpha,\beta$- or $\beta,\gamma$-unsaturated aliphatic acids. These include chloracetic acid chloride, bromacetic acid bromide, $\alpha$-chloropropionic acid chloride, $\beta$-chloropropionic acid chloride, acrylic acid chloride and $\alpha$-methylacrylic acid chloride.

The reaction takes place in aqueous, neutral to basic, preferably soda-alkaline medium, at temperatures in the range of 0° to 50° C, preferably 0°–20° C, and at pH values of 6.5 to 12, preferably at pH 8 to 10.

The addition of $R_5—NH_2$ followed by several hours stirring and final heating yields the compound of formula (II).

The range of suitable compounds of formula (VIII) includes ammonia and primary aliphatic amines of low molecular weight which may be substituted, for example the methyl-, ethyl-, propyl- and iso-propyl-amines, 2-hydroxyethylamine, 2- and 3-hydroxypropylamine and 2-hydroxybutylamine.

The phthalocyanine dyes of formula (I) are suitable for dyeing leather and for the exhaustion dyeing, pad dyeing and printing of wool, silk, synthetic polyamide fibers, natural and regenerated cellulosic fibers, such as cotton, linen, hemp, viscose and cuprammonium rayon, and of blends and other forms of these fibers. They are especially suitable for the exhaustion dyeing of natural and regenerated cellulosic fibers.

In dyeing, padding and printing methods of application the commonly used wetting, levelling, thickening and other textile and leather auxiliary agents can be employed as required. During or subsequent to dyeing, padding or printing, the goods are submitted to a heat treatment in the presence of an agent which binds acid. With wool, silk and synthetic polyamide fibers it is advisable to use an acid-binding agent which adjusts the pH to a value between 5 to 8, e.g. an acetate or phosphate buffer, hexamethylene tetramine, or, especially when acetic acid is used for dyeing, sodium carbonate or bicarbonate. Suitable acid-binding agents for cellulosic fibers are sodium carbonate and bicarbonate, sodium metasilicate and hydroxide, trisodium phosphate, and the corresponding potassium compounds.

On natural and regenerated cellulosic fibers the dyes of this invention give dyeings and prints of very good fastness to wet treatments (washing at 95° C, water and perspiration), together with good fastness to rubbing, stoving and dry cleaning.

The new dyes reserve acetate, triacetate, polyacrylonitrile and polyester fibers. In the following examples the parts and percentages are by weight and the temperatures are expressed in degrees centigrade.

Example 1

106 Parts of the compound of the formula

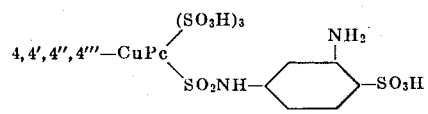

are added to 1,200 parts of water to form a neutral solution. To this 16 parts of sodium carbonate are added, then 17 parts of chloracetylchloride are dropped in slowly at 5°, after which 100 parts of a 40 percent methylamine solution are allowed to flow in. The mixture is stirred for 12 hours. After this time the temperature is increased to 80° and the reaction mixture neutralized with hydrochloric acid. Sodium chloride and further hydrochloric acid are added to precipitate the intermediate of the formula

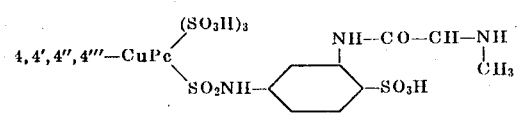

The intermediate is filtered off and the filter cake washed well with a hydrochloric-acid solution of sodium chloride, stirred into 1,200 parts of water and brought into solution by the addition of sodium hydroxide solution in an amount sufficient to adjust the pH to the neutral point. Then 10 parts of sodium bicarbonate are added and in the course of 2 hours 20 parts of 5-chloro-2,4,6-trifluoropyrimidine are dropped in at 10°. Stirring is continued for 12 hours without further cooling and subsequently the temperature is raised to 40°. The dye is precipitated by the addition of sodium chloride, filtered off and vacuum dried at 40°.

Printing Method

A mercerized cotton fabric is printed with a paste of the following composition:

| | |
|---|---|
| 30 | parts of the dye obtained as in Example 1, |
| 100 | parts of urea, |
| 395 | parts of water, |
| 450 | parts of a 3 % sodium alginate thickening agent, |
| 10 | parts of sodium 1-nitrobenzene-3-sulphonate and |
| 15 | parts of sodium bicarbonate |
| 1,000 | parts |

The fabric is dried, steamed for 10–15 minutes at 102°–104°, rinsed with cold and warm water, soaped at the boil, rinsed again and dried. A print of greenish turquoise shade is obtained which has very good light and wet fastness properties. The unprinted areas of the pattern are left a clear white.

Example 2

A neutral solution of 99 parts of the compound of the formula

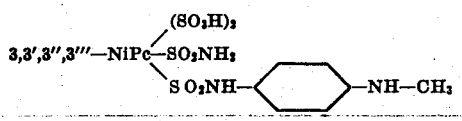

in 1,800 parts of water is prepared. The mode of operation of Example 1 is followed, the compound being condensed with chloracetyl chloride with the subsequent addition of 150 parts of 25 percent ammonia solution. The mixture is then stirred for 12 hours, raised to 80° and neutralized with hydrochloric acid, on which the intermediate of the formula

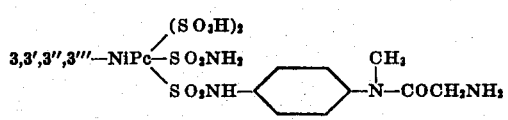

is precipitated by the addition of sodium chloride. It is filtered off, the filter cake washed well with sodium chloride solution and dissolved in 1,500 parts of water at 70°. 22 Parts of 2,4,5,6-tetrachloropyrimidine are added and the mixture is stirred vigorously at 70°, the pH being maintained at 5–7 by the gradual addition of 10 percent sodium hydroxide solution. As soon as no further alkali is consumed the dye is precipitated with sodium chloride, filtered off and dried at 70°–80 with vacuum.

Printing Method

A mercerized cotton fabric is printed with a paste of the following composition:

| | |
|---|---|
| 30 | parts of the dye obtained as in Example 2, |
| 100 | parts of urea |
| 395 | parts of water, |
| 450 | parts of a 3 % sodium alginate thickening agent, |
| 10 | parts of sodium 1-nitrobenzene-3-sulphonate and |
| 15 | parts of sodium carbonate |
| 1,000 | parts |

The fabric is dried, steamed for 10–15 minutes at 102°–104°, rinsed with cold and warm water, soaped at the boil, rinsed again and dried. A turquoise blue print is obtained which has very good light and wet fastness properties. The unprinted parts of the fabric show a clear, unstained white.

Pad Dyeing Method

A mercerized cotton fabric is padded with a solution of 30 parts of the dye of Example 1 in 1,000 parts of water, expressed to retain 90 percent of its weight of the solution and then treated for 30 minutes at 70° in a bath containing 30 parts of calcined sodium sulphate and 10 parts of calcined sodium carbonate in 1,000 parts of water. The fixed dyeing is washed off by the normal method. The brilliant turquoise dyeing thus produced has excellent light and wet fastness properties.

The following table gives details of further compounds of formula (I) which have the specific formula

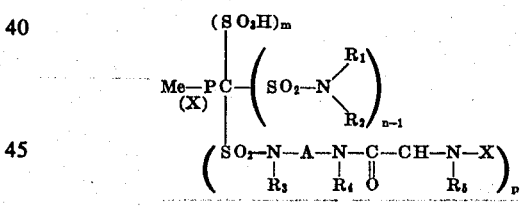

where $x$ denotes the position of the substituent in the phthalocyanine nucleus. The last column of the table gives the shade of these dyes in prints on mercerized cotton fabric.

| Ex. No. | Me | x | m | n | p | R₁ | R₂ | R₃ | R₄ | A | R₅ | X | Shade |
|---|---|---|---|---|---|---|---|---|---|---|---|---|---|
| 3 | 2H | 4 | 3 | 1 | 1 | — | — | CH₃ | CH₃ | —CH₂—CH₂— | —CH₃ | Chloracetyl | Turquoise. |
| 4 | Ni | 3 | 2 | 2 | 1 | H | CH₃ | H | H | —CH₂—CH— / CH₃ | —C₂H₅ | β-Chloropropionyl | Do. |
| 5 | Ni | 3 | 3 | 1 | 1 | — | — | — | —CH₂—CH₂— | —CH₂—CH₂— | H | 2,4,6-trichloropyrimidyl-5-methylene | Do. |
| 6 | Cu | 3 | 2 | 2 | 1 | CH₃ | CH₃ | H | H | —CH₂—CH₂— | H | 2,4,5-trifluoropyrimidyl-6 | Do. |
| 7 | Ni | 3 | 2 | 2 | 1 | H | H | CH₃ | H | [phenyl-SO₃H] | —CH₃ | 2,4-dichloro-5-bromopyrimidyl-6 | Do. |
| 8 | Ni | 4 | 1 | 2 | 1 | CH₂CH₂—OH | CH₂CH₂—OH | H | H | [phenyl-SO₃H] | —C₂H₅ | do | Do. |
| 9 | Cu | 4 | 2 | 2 | 1 | H | H | H | H | [—NH—phenyl(SO₃H)—phenyl(HO₃S)—] | —CH₃ | 2,4-dibromo-1,3,5-triazinyl-6 | Do. |
| 10 | Ni | 3 | 1 | 3 | 1 | H | H | H | H | [—CH=CH—phenyl—N=N—phenyl(SO₃H)—] | —CH₃ | 2,4-dichloropyrimidyl-5-carbonyl | Green. |
| 11 | Ni | 3 | 2 | 2 | 1 | H | H | H | H | [naphthyl-(SO₃H)₂] | H | 2,4,5-trifluoropyrimidyl-6 | Turquoise. |
| 12 | Cu | 4 | 2 | 2 | 1 | C₂H₅ | C₂H₅ | H | H | [phenyl—CH₂—] | CH₃ | 2,4-dichloro-1,3,5-triazinyl-6 | Do. |
| 13 | Cu | 3 | 2 | 2 | 1 | H | H | H | H | [thiazole ring] | CH₃ | 2,4,5-trichloropyrimidyl-6 | Do. |
| 14 | Cu | 4 | 2 | 2 | 1 | H | H | CH₂CH₂—OH | CH₂CH₂—OH | —CH₂—CH₂— | CH₃ | 2,3-dichloroquinoxalyl-6-carbonyl | Do. |
| 15 | Cu | 3 | 2 | 2 | 1 | CH₂CH₂—OH | H | H | H | —CH₂— | CH₂CH₂—OH | 2-chloro-4-amino-1,3,5-triazinyl-6 | Do. |
| 16 | Ni | 3 | 2 | 1 | 1 | — | — | — | — | [phenyl—] | —CH₃ | do | Do. |

| Ex. No. | Me | z | m | n | p | R₁ | R₂ | R₃ | R₄ | A | —C_rH_r— | R₅ | X | Shade |
|---|---|---|---|---|---|---|---|---|---|---|---|---|---|---|
| 17 | Ni | 3 | 3 | 1 | 1 | — | — | H | H | phenyl-SO₃H | —CH₂— | —CH₃ | 2-chloro-4-methyl-amino-1,3,5-triazinyl-6 | Do. |
| 18 | Ni | 4 | 3 | 1 | 1 | — | — | H | H | Same as above | —CH₂— | —CH₃ | 2-chloro-4-(3'-sulfophenylamino)-1,3,5-triazinyl-6 | Do. |
| 19 | Ni | 3 | 3 | 1 | 1 | CH₃ | — | H | H | phenyl-SO₃H | —CH₂— | —C₂H₅ | 2-chloro-4-methoxy-1,3,5-triazinyl-6 | Do. |
| 20 | Cu | 4 | 2 | 2 | 1 | CH₃ | CH₃ | H | C₂H₅ | phenyl | —CH₂— | CH₃ | 2-chloro-4-hydroxyethylamino-1,3,5-triazinyl-6 | Do. |
| 21 | Ni | 4 | 2 | 2 | 1 | H | H | H | H | phenyl-SO₃H | —CH₂— | CH₃ | Acrylyl | Do. |
| 22 | Ni | 3 | 3 | 1 | 1 | — | — | H | H | Same as above | —CH₂— | CH₃ | 2-chloro-4-di-(hydroxyethyl)-amino-1,3,5-triazinyl-6 | Do. |
| 23 | Cu | 4 | 3 | 1 | 1 | — | — | H | H | phenyl-OCH₃ | —CH₂— | H | 2,4-dichloro-5-methylpyrimidyl-6 | Do |
| 24 | Cu | 4 | 3 | 1 | 1 | — | — | H | H | —CH₂CH₂CH₂— | —CH₂— | H | α-Bromacrylyl | Do. |
| 25 | 2H | 4 | 3 | 1 | 1 | — | — | CH₃ | H | cyclohexyl—CH₂CH₂O— | —CH₂— | H | β-Chlorethylsulfonyl | Do. |
| 26 | Ni | 4 | 3 | 1 | 1 | — | — | H | H | phenyl-OH | —CH₂CH₂—CH₂CH₂— | H | 2,4-dibromo-pyrimidyl-5-methylene | Do. |
| 27 | Ni | 3 | 3 | 1 | 1 | — | — | H | H | phenyl-Cl | —CH₂CH₂— | CH₃ | 2,4-dichloro-6-methylpyrimidyl-5-methylene | Do. |
| 28 | Cu | 4 | 2 | 2 | 1 | — | — | H | H | naphthyl | —CH₂CH₂— | CH₃ | β-Sulphatopropionyl | Do. |
| 29 | Ni | 3 | 3 | 1 | 1 | H | H | H | H | naphthyl-N=N-naphthyl | —CH₂— | H | Methylsulphonyloxypropionyl | Green. |
| 30 | Ni | 3 | 1 | 2 | 2 | H | H | CH₃ | CH₃ | phenyl-SO₃H | —CH₂— | H | 2,4-dichlorpyrimidyl-6 | Turquoise. |

| Ex. No. | Me | x | m | n | p | R₁ | R₂ | R₃ | R₄ | A | —C_rH_{2r}— | R₅ | X | Shade |
|---|---|---|---|---|---|---|---|---|---|---|---|---|---|---|
| 31 | Cu | 4 | 2 | 2 | 1 | H | H | H | H | | —C_rH_{2r}— | CH₃ | ......do...... | Do. |
| 32 | Ni | 4 | 3 | 1 | 1 | | | | | | —CH₂— | CH₃ | β-Sulfatoethylsulphonyl. | Green. |
| 33 | Cu | 4 | 2 | 2 | 1 | H | H | H | H | | —CH₂— | CH₃ | 2,4-dibromo-5-methoxycarbonyl-pyrimidyl-6. | Turquoise. |
| 34 | Cu | 4 | 2 | 2 | 1 | H | H | H | H | | —CH₂— | H | 2,4-dichloro-5-ethoxycarbonyl-pyrimidyl-6. | Do. |
| 35 | Cu | 3 | 2 | 2 | 1 | CH₃ | H | H | H | | —CH₂CH₂— | H | Vinylsulphonyl. | Do. |
| 36 | Ni | 3 | 2 | 2 | 1 | CH₃ | CH₃ | C₂H₅ | C₂H₅ | | —CH₂— | H | γ-Bromocrotonyl. | Do. |
| 37 | Cu | 4 | 1 | 3 | 1 | H | H | H | H | | —CH₂— | CH₃ | β-Phenylsulphonyloxypropionyl. | Do. |
| 38 | 2H | 3 | 3 | 1 | 1 | | | | | | —CH₂— | H | 2,4-dichloro-5-bromopyrimidyl-6. | Do. |
| 39 | Cu | 4 | 3 | 1 | 1 | | | | —CH₂—CH₂— | | —CH₂— | CH₃ | 2,3-dibromoquinoxalyl-5-sulphonyl. | Do. |
| 40 | Cu | 4 | 2 | 2 | 1 | n-C₃H₇ | n-C₃H₇ | H | H | | —CH₂— | CH₃ | 1,4-dichlorophthalazyl-6-carbonyl. | Do. |
| 41 | Cu | 4 | 2 | 2 | 1 | —CH₃ | —CH₃ | H | H | | —CH₂— | CH₃ | 2-chlorobenzothiazolyl-5-carbonyl. | Do. |
| 42 | Cu | 3 | 1 | 3 | 1 | H | H | CH₃ | CH₃ | | —CH₂— | H | 2-chlorobenzothiazolyl-5-carbonyl. | Do. |
| 43 | Ni | 4 | 2 | 2 | 1 | CH₃CH₂CH₂CH₃ OH | H | H | H | | —CH₂— | H | 2-chlorobenzothiazol-5-sulphonyl. | Do. |
| 44 | Cu | 3 | 2 | 2 | 1 | H | H | H | H | | —CH₂— | H | 3-(4',5'-dichloro-6'-pyridazonyl-1')-benzol-1-carbonyl. | Do. |

| Ex. No. | Me | r | m | n | p | R₁ | R₂ | R₃ | R₄ | A | | R₅ | X | Shade |
|---|---|---|---|---|---|---|---|---|---|---|---|---|---|---|
| 45 | Cu | 3 | 2 | 2 | 1 | H | H | C₂H₅ | H | | | —C₂H₄— | β-(4',5'-dichloro-6'-pyridazonyl-1')-propionyl | Do. |
| 46 | Cu | 3 | 3 | 1 | 1 | | | | H | ![phenyl-NH-phenyl-SO₃H] | | —CH₂— | 2,4-difluoro-5-chloropyrimidyl-6 | Di. |
| 47 | Cu | 4 | 3 | 1 | 1 | | | | H | ![phenyl-SO₃H] | | —CH₂— | 2,4,5-trichloropyrimidyl-6 | Do. |
| 48 | Cu | 4 | 2 | 2 | 1 | H | H | H | H | Same as above | | —CH₂— | 2,4-difluoro-5-chloropyrimidyl-6 | Do. |
| 49 | Cu | 4 | 2 | 2 | 1 | H | H | H | H | do | | —CH₂— | 2,4,5-trichloropyrimidyl-6 | Do. |
| 50 | Cu | 4 | 1 | 3 | 1 | H | H | H | H | do | | —CH₂— | 2,4-difluoro-5-chloropyrimidyl-6 | Do. |
| 51 | Cu | 4 | 1 | 3 | 1 | H | H | H | H | do | | —CH₂— | 2,4,5-trichloropyrimidyl-6 | Do. |
| 52 | Cu | 3 | 2 | 2 | 1 | H | H | H | H | do | | —CH₂— | 2,4-difluoro-5-chloropyrimidyl-6 | Do. |
| 53 | Cu | 3 | 2 | 2 | 1 | H | H | H | H | do | | —CH₂— | 2,4-difluoro-5-chloropyrimidyl-6 | Do. |
| 54 | Cu | 3 | 3 | 1 | 1 | | | | H | do | | —CH₂— | 2,4,5-trichloropyrimidyl-6 | Do. |
| 55 | Cu | 3 | 3 | 1 | 1 | | | | H | do | | —CH₂— | 2-chloro-4-ethylamino-1,3,5-triazinyl-6 | Do. |
| 56 | Cu | 3 | 3 | 1 | 1 | | | | H | do | | —CH₂— | 2-chloro-4-(2'-hydroxypropylamino)-1,3,5-triazinyl-6 | Do. |
| 57 | Cu | 3 | 3 | 1 | 1 | | | | H | do | | —CH₂— | 2-chloro-4-(2'-methoxypropylamino)-1,3,5-triazinyl-6 | Do. |
| 58 | Cu | 3 | 3 | 1 | 1 | | | | H | do | | —CH₂— | 2-chloro-4-(2'-carboxyethylamino)-1,3,5-triazinyl-6 | Do. |
| 59 | Cu | 3 | 3 | 1 | 1 | | | | H | do | | —CH₂— | 2-chloro-4-N-methyl-N-carboxymethylamino-1,3,5-triazinyl-6 | Do. |

| Ex. No. | Me | x | m | n | p | R₁ | R₂ | R₃ | R₄ | A | —C_rH_{2r}— | R₅ | X | Shade |
|---|---|---|---|---|---|---|---|---|---|---|---|---|---|---|
| 60 | Cu | 3 | 3 | 1 | 1 | | | H | H | do | —CH₂— | CH₃ | 2-chloro-4-morpholino-1.3.5-triazinyl-6. | Do. |
| 61 | Cu | 3 | 3 | 1 | 1 | | | H | H | do | —CH₂— | CH₃ | 2-chloro-4-(2'-sulfoethylamino)-1.3.5-triazinyl-6. | Do. |
| 62 | Cu | 4 | 3 | 1 | 1 | | | H | H | do | —CH₂— | CH₃ | 2-chloro-4-(4'-carboxyphenylamino)-1.3.5-triazinyl-6. | Do. |
| 63 | Cu | 4 | 3 | 1 | 1 | | | H | H | do | —CH₂— | CH₃ | 2-chloro-4-N-methyl-N-phenylamino-1.3.5-triazinyl-6. | Do. |
| 64 | Cu | 4 | 3 | 1 | 1 | | | H | H | do | —CH₂— | CH₃ | 2-chloro-4-phenylamino-1.3.5-triazinyl-6. | Do. |
| 65 | Cu | 4 | 3 | 1 | 1 | | | H | H | do | —CH₂— | CH₃ | 2-chloro-4-benzylamino-1.3.5-triazinyl-6. | Do. |
| 66 | Cu | 3 | 3 | 1 | 1 | | | H | H | do | —CH₂— | CH₃ | 2-chloro-4-cyclohexylamino-1.3.5-triazinyl-6. | Do. |

Formulae of representative dyes of the foregoing examples are as follows:

EXAMPLE 1

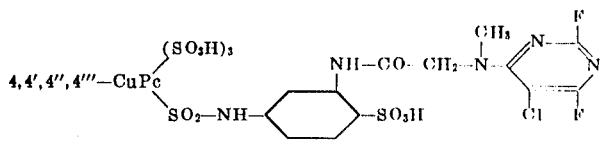

EXAMPLE 2

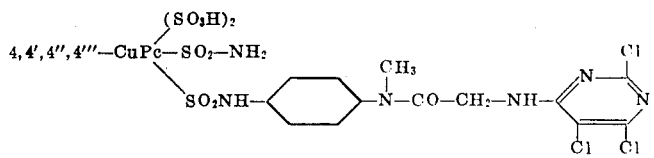

EXAMPLE 47

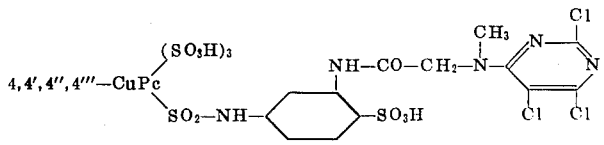

EXAMPLE 48

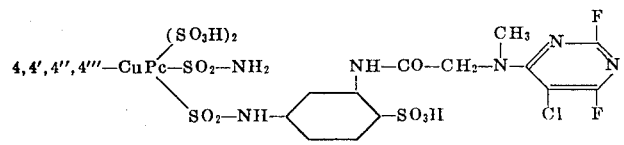

EXAMPLE 49

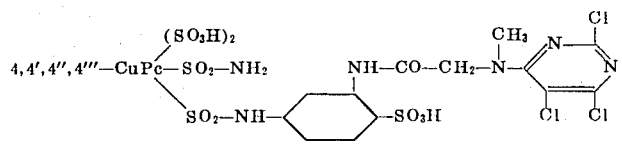

EXAMPLE 50

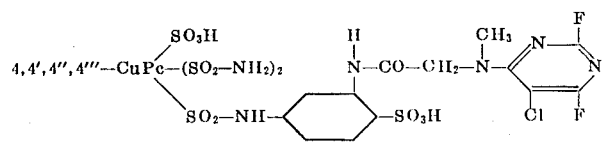

EXAMPLE 51

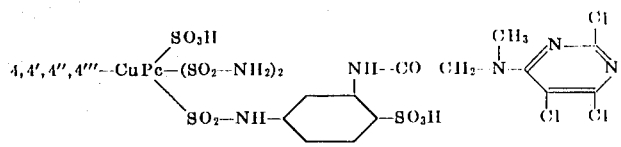

EXAMPLE 52

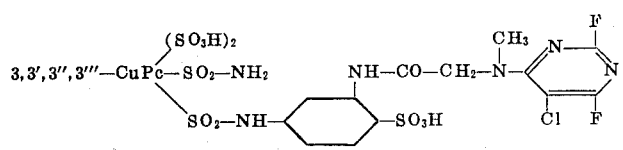

EXAMPLE 53

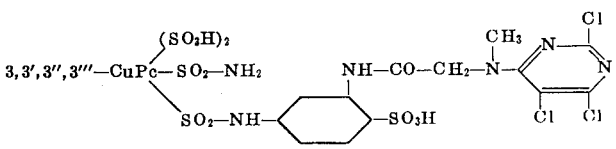

Having thus disclosed the invention what we claim is:
1. Reactive phthalocyanine dye of the formula

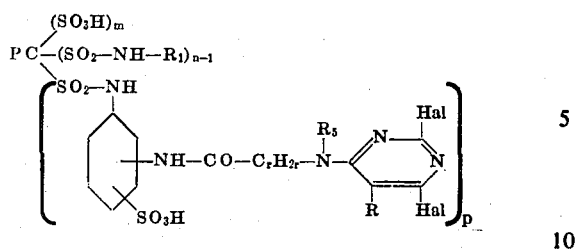

wherein
PC is a tri- or tetra-substituted phthalocyanine radical, each substituent of which is in one of the 3- and 4-positions;
R is a hydrogen atom, lower alkyl or halo;
$R_1$ is a hydrogen atom, lower alkyl or lower hydroxyalkyl;
$R_5$ is a hydrogen atom, lower alkyl or lower hydroxyalkyl;
Hal is halo;
m is an integer from 1 to 3, inclusive;
n is an integer from 1 to 3, inclusive;
p is an integer from 1 to 2, inclusive;
r is an integer from 1 to 5, inclusive; and the sum of n, m and p is 4 or 5.

2. Reactive phthalocyanine dye according to claim 1 wherein:
PC is a radical of a copper or a nickel phthalocyanine;
R is a hydrogen atom, methyl, ethyl or halo;
$R_1$ is a hydrogen atom, methyl, ethyl or hydroxyethyl;
$R_5$ is a hydrogen atom or methyl;
p is 1; and
the $HO_3S$-group on the phenylene ring is ortho to the —NH—CO-substituent thereon.

3. Reactive phthalocyanine dye according to claim 2 wherein
PC is a copper phthalocyanine radical;
$R_1$ is a hydrogen atom;
$R_5$ is methyl;
each Hal is, independently, fluoro, chloro or bromo; and the $HO_3S$-group on the phenylene ring is para to the —NH—$SO_2$-substituent thereon.

4. The dye according to claim 2 of the formula

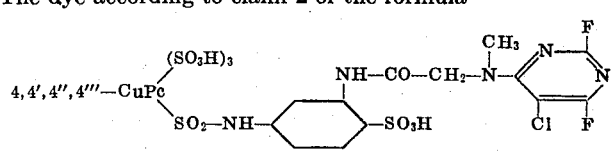

5. The dye according to claim 2 of the formula

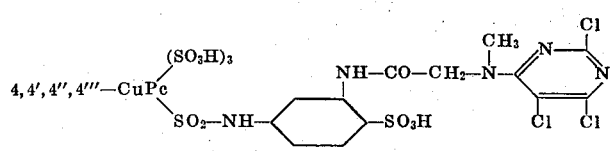

6. The dye according to claim 2 of the formula

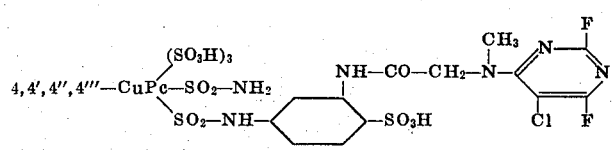

7. The dye according to claim 2 of the formula

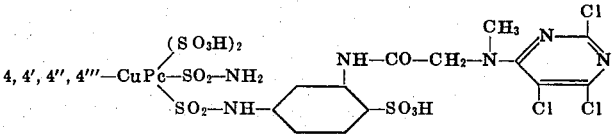

8. The dye according to claim 2 of the formula

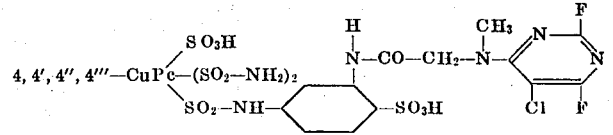

9. The dye according to claim 2 of the formula
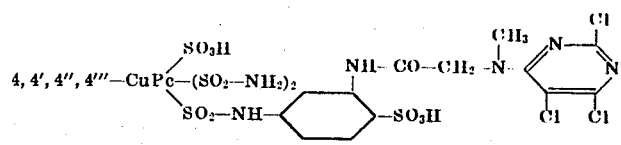
10. The dye according to claim 2 of the formula
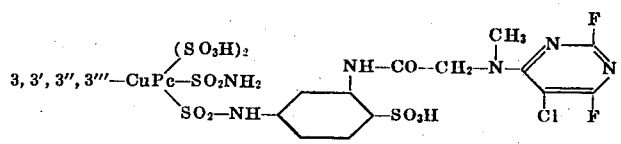
11. The dye according to claim 2 of the formula
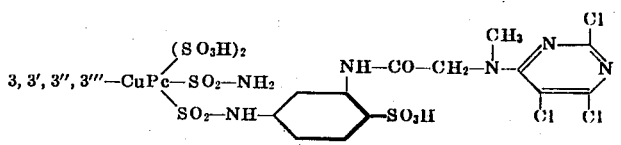
* * * * *